(12) United States Patent
Yuan et al.

(10) Patent No.: US 6,597,825 B1
(45) Date of Patent: Jul. 22, 2003

(54) OPTICAL TAP FOR AN OPTICAL SWITCH

(75) Inventors: Shifu Yuan, Santa Barbara, CA (US); Xuezhe Zheng, Goleta, CA (US)

(73) Assignee: Calient Networks, Inc., San Jose, CA (US)

( * ) Notice: Subject to any disclaimer, the term of this patent is extended or adjusted under 35 U.S.C. 154(b) by 0 days.

(21) Appl. No.: 10/016,314

(22) Filed: Oct. 30, 2001

(51) Int. Cl.[7] ................................................. G02B 6/26
(52) U.S. Cl. ............................ 385/16; 385/18; 385/33; 385/36
(58) Field of Search ............................... 385/16–24, 36, 385/33, 37

(56) References Cited

U.S. PATENT DOCUMENTS

| | | |
|---|---|---|
| 4,243,297 A | 1/1981 | Elion |
| 4,365,863 A | 12/1982 | Broussaud |
| 4,421,381 A | 12/1983 | Ueda et al. |
| 4,598,585 A | 7/1986 | Boxenhorn |
| 4,611,886 A | 9/1986 | Cline et al. |
| 4,654,663 A | 3/1987 | Alsenz et al. |
| 4,848,999 A | 7/1989 | Taylor |
| 4,892,388 A | 1/1990 | Taylor |
| 4,900,119 A | 2/1990 | Hill et al. |
| 4,922,756 A | 5/1990 | Henrion |
| 4,923,273 A | 5/1990 | Taylor |
| 4,941,724 A | 7/1990 | Couden et al. |
| 5,016,072 A | 5/1991 | Greiff |
| 5,016,966 A | 5/1991 | Bowen et al. |
| 5,083,857 A | 1/1992 | Hornbeck |
| 5,097,354 A | 3/1992 | Goto |
| 5,172,262 A | 12/1992 | Hornbeck |
| 5,203,208 A | 4/1993 | Bernstein |
| 5,204,922 A | 4/1993 | Weir et al. |
| 5,226,321 A | 7/1993 | Varnham et al. |
| 5,272,707 A | 12/1993 | Orlando |
| 5,450,512 A | 9/1995 | Asakura |
| 5,477,350 A | 12/1995 | Riza et al. |

(List continued on next page.)

FOREIGN PATENT DOCUMENTS

| | | |
|---|---|---|
| EP | 1 120677 A2 | 8/2001 |
| GB | 2 175 705A A | 12/1986 |
| JP | 60-107017 | 6/1985 |
| JP | 4-18507 | 1/1992 |
| JP | 5-107485 A | 4/1993 |
| JP | 6-180428 | 6/1994 |

OTHER PUBLICATIONS

Robert E. Mihailovich, Z. L. Zhang, K. A. Shaw, and Noel C. MacDonald, "Single–Crystal Silicon Torsional Resonators." School of Electrical Engineering, Cornell University, Ithaca, NY 14853, pp. 184–188, (Feb. 1993).

Lin L. Y. et al., "Micro–electro–mechanical systems (MEMS) for WDM optical–crossconnect Networks" Military Communications Conference Proceedings, 1999. Milcom 1999. IEEE Atlantic City, NJ, USA Oct. 31–Nov. 3, 1999, Piscataway, NJ, USA, IEEE, US, Oct. 31, 1999, pp. 954–957, XP01036982, ISBN: 0–7803–5538–5. 3.

*Primary Examiner*—Phan T. H. Palmer
(74) *Attorney, Agent, or Firm*—Blakely, Sokoloff, Taylor & Zafman LLP

(57) ABSTRACT

An all-optical switch includes an array of input optical fibers and an array of output optical fibers. A rhomboidal prism beam splitter is positioned in operative relationship with the array of input fibers such that when an array of optical beams is propagated from the array of input optical fibers, the beam splitter splits the array of optical beams into a signal path and a tap path. The rhomboidal prism beam splitter includes a partial internal reflection (PIR) surface and a total internal reflection (TIR) surface. The PIR surface and the TIR surface cooperate to split the array of optical beams into the signal path and the tap path such that the signal path is substantially parallel to the tap path upon exiting the beam splitter.

35 Claims, 6 Drawing Sheets

U.S. PATENT DOCUMENTS

| | | |
|---|---|---|
| 5,488,862 A | 2/1996 | Neukermans et al. |
| 5,524,153 A | 6/1996 | Laor |
| 5,536,988 A | 7/1996 | Zhang et al. |
| 5,555,330 A | 9/1996 | Pan et al. |
| 5,568,575 A | 10/1996 | Sato |
| 5,629,790 A | 5/1997 | Neukermans et al. |
| 5,642,447 A | 6/1997 | Pan et al. |
| 5,642,448 A | 6/1997 | Pan et al. |
| 5,652,814 A | 7/1997 | Pan et al. |
| 5,673,139 A | 9/1997 | Johnson |
| 5,889,904 A | 3/1999 | Pan et al. |
| 5,900,983 A | 5/1999 | Ford et al. |
| 5,920,417 A | 7/1999 | Johnson |
| 5,960,133 A | 9/1999 | Tomlinson |
| 5,982,554 A | 11/1999 | Goldstein et al. |
| 6,000,280 A | 12/1999 | Miller et al. |
| 6,005,998 A | 12/1999 | Lee |
| 6,014,486 A | 1/2000 | Robinson |
| 6,023,542 A | 2/2000 | Pan et al. |
| 6,049,412 A | 4/2000 | Bergmann et al. |
| 6,097,858 A | 8/2000 | Laor |
| 6,097,859 A | 8/2000 | Solgaard et al. |
| 6,097,860 A | 8/2000 | Laor |
| 6,101,299 A | 8/2000 | Laor |
| 6,124,956 A | 9/2000 | Severn |
| 6,198,858 B1 | 3/2001 | Pan et al. |
| 6,201,622 B1 | 3/2001 | Lobbett et al. |
| 6,208,784 B1 | 3/2001 | Glen et al. |
| 6,226,424 B1 | 5/2001 | Ball et al. |
| 6,226,425 B1 | 5/2001 | Chang-Hasnain et al. |
| 6,236,481 B1 | 5/2001 | Laor |
| 6,240,222 B1 | 5/2001 | Bergmann |
| 6,249,626 B1 | 6/2001 | Bergmann |
| 6,253,001 B1 | 6/2001 | Hoen |
| 6,278,812 B1 | 8/2001 | Lin et al. |
| 6,289,145 B1 | 9/2001 | Solgaard et al. |
| 6,314,115 B1 | 11/2001 | Delfyett et al. |
| 6,328,482 B1 | 12/2001 | Jian |

OPTICAL TAP FOR AN OPTICAL SWITCH

FIELD OF THE INVENTION

The present invention relates generally to fiber optics and optical switches. More particularly, the present invention relates to an optical switch tap for an all-optical or photonic switch.

BACKGROUND

Use of large-scale MEMS-based optical switches is the emerging choice for all-optical networks. As switch sizes grow from tens of ports to thousands of ports, the tap monitoring function becomes increasingly important. For optical cross-connect applications, an optical tap function provides signal performance monitoring including such parameters as power level, signal to noise ratio, wavelength, and bit error rate. The tap optics provide a method to selectively pick up any channel and monitor the selected channel performance.

A MEMS (micro-electro-mechanical system) device is a micro-sized mechanical structure having electrical circuitry. A MEMS can be fabricated using conventional integrated circuit (IC) fabrication methods. One type of MEMS device is a microscopic gimbaled mirror device. A gimbaled mirror device includes a mirror component, which is suspended off a substrate, and is able to pivot and to redirect light beams to varying angles within a three dimensional surface.

One type of optical switch includes arrays of electrically controlled MEMS mirror devices arranged in mirror arrays to selectively couple light beams from input fibers to output fibers. Such an optical switch is commonly referred to as an all-optical cross-connect switch or photonic switch. For each port of the switch, an input pivoting mirror is located in a path of a respective light beam being propagated by a respective input optical fiber. The input pivoting mirror is pivotable relative to the mirror substrate to alter an angle at which the light beam is reflected therefrom. The angle is controlled so that the light beam falls on a respective output pivoting mirror in line with a respective output optical fiber to which the light beam is to be switched. The output pivoting mirror then reflects the light beam and is pivoted so as to ensure that a light beam is propagated in a direction in which the output optical fiber extends, to ensure coupling of the light beam into the output optical fiber.

FIG. 1 shows an example of a prior art MEMS gimbaled mirror device used to redirect light beams in an optical switch. Light beams from fibers 1 located in input fiber array 2 are input to the optical switch and travel through input lens array 3. Each beam is then reflected from a mirror located on input movable mirror array 4 to another mirror on output mirror array 5. The light beams then travel through lens array 6 to output fiber array 7. Thus, a given beam is switched from an input fiber of input fiber array 2 to an appropriate output fiber of output fiber array 7 by being redirected by mirror arrays 4 and 5.

For this type of optical networking application, the intensity of the signals at the input or the output of the switch may be monitored to verify that the network is operating properly. Thus, a fiber tap array 9 is optically coupled to the fibers of input fiber array 2. The light beams traveling through each fiber of fiber array 2 are then sampled by diverting a portion of the beams through fiber tap array 9 to receivers in electrical receiver array 91. The receivers in receiver array 91 may convert the optical signals into digital electronic signals, or an optical switch may be used to multiplex the signals into a single electrical receiver. A disadvantage of this approach is that an individual tap fiber in tap array 9 must be connected to each input fiber of input array 2. Another disadvantage is that an individual receiver must be connected to each tap fiber. When using an electrical receiver array, or an additional optical switch has to be used when using a single electrical receiver. Therefore, the cost of monitoring the signals using this approach can be very high.

Another type of optical tap samples selected wavelengths or a selected range of wavelengths from one or more light beams to perform the monitoring function. This type of tap may include filters that pass the selected wavelength band. Other types of optical taps may include prisms or mirrors that direct a portion of the light beams in a separate direction that is not parallel to the path of the light beams that propagate through the switch along a signal path. Certain optical switch taps known in the art require additional components in the path of the light beams. Additional components introduce complications and variables relating to power loss and alignment difficulties, for example.

An all-optical switch provides very high data rates for data networks using optical signals in the form of light beams. In an all-optical switch, the light beams are not required to be converted into electrical signals for switching between input fibers and output fibers.

For an all-optical switch to operate properly, the mirror devices must be spatially arranged such that the waists of the light beams are at an optimum position relative to the surface of the mirror devices. Monitoring the light beams to determine if an all-optical switch is operating properly, however, can be problematic. For example, if an optical device is to be inserted into an optical path to monitor the light beams, the inserted device can increase the path length, which can cause insertion loss. Insertion loss relates to the loss of optical power within the optical switch. An increase in insertion loss can adversely affect the intensity of the light beams passing through the optical switch thereby causing the output power of the switch to fall below the requirements of the network or other optical system in which it is used.

SUMMARY OF THE INVENTION

For one embodiment, an all-optical switch includes an array of input optical fibers and an array of output optical fibers. A rhomboidal prism beam splitter is positioned in operative relationship with the array of input fibers such that when an array of optical beams is propagated from the array of input optical fibers, the beam splitter splits the array of optical beams into a signal path and a tap path. The rhomboidal prism beam splitter includes a partial internal reflection (PIR) surface and a total internal reflection (TIR) surface. The PIR surface and the TIR surface cooperate to split the array of optical beams into the signal path and the tap path such that the signal path is parallel to the tap path upon exiting the beam splitter.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

Embodiments of an optical tap for an optical switch are described. For one exemplary embodiment, an all-optical switch includes an array of input optical fibers and an array of output optical fibers. A rhomboidal prism beam splitter is positioned in operative relationship with the array of input fibers. When an array of optical beams is propagated from the array of input optical fibers, the beam splitter splits the array of optical beams into a signal path and a tap path. Signal beams propagate along the signal path and tap beams propagate along the tap path. The rhomboidal prism beam splitter includes a partial internal reflection (PIR) surface and a total internal reflection (TIR) surface. The PIR surface and the TIR surface cooperate to split the array of optical beams into the signal path and the tap path. The signal path is parallel to the tap path upon exiting the beam splitter.

Figure 1:
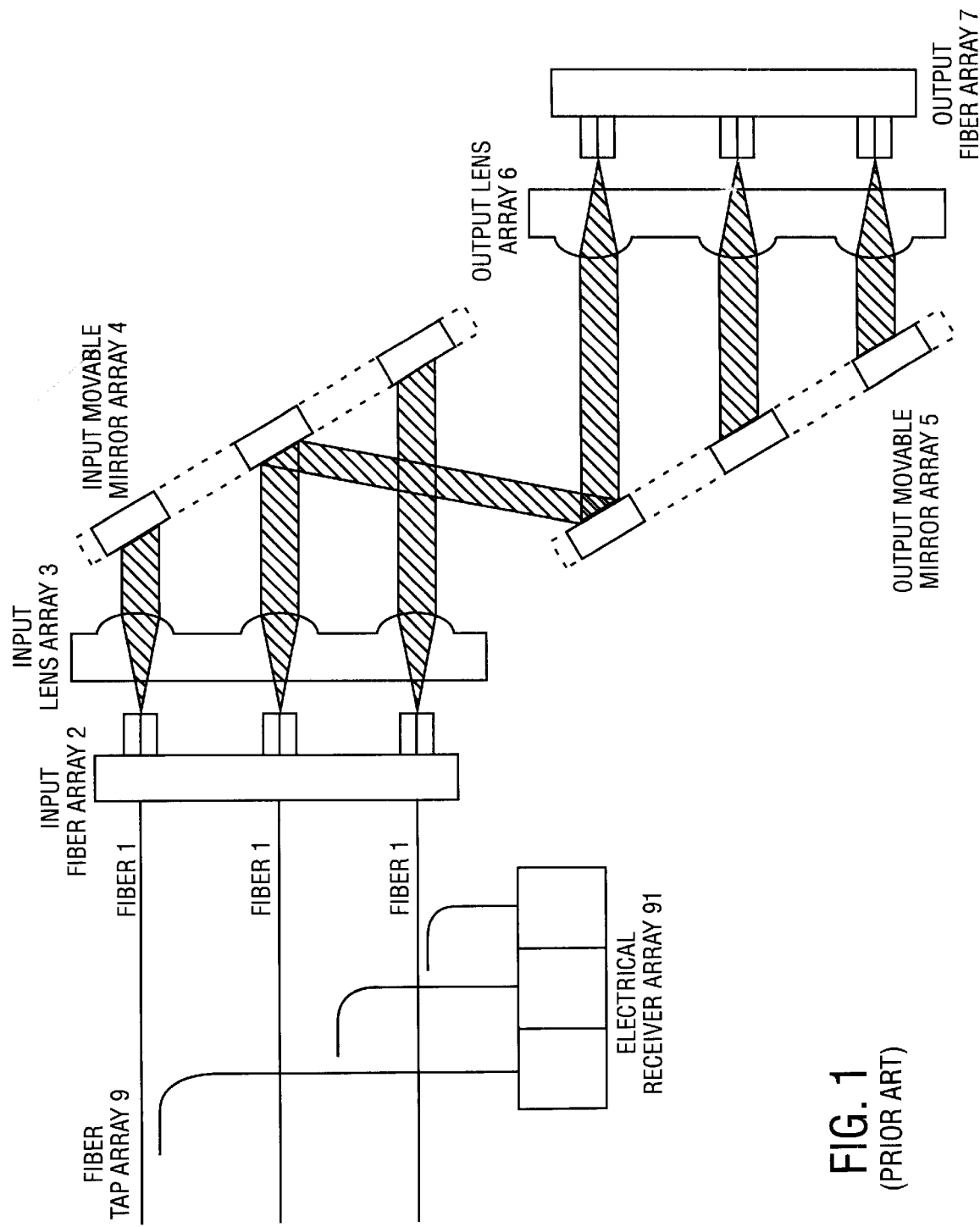
FIG. 1 shows a schematic view of a prior art optical switch including an optical tap.
Figure 2:
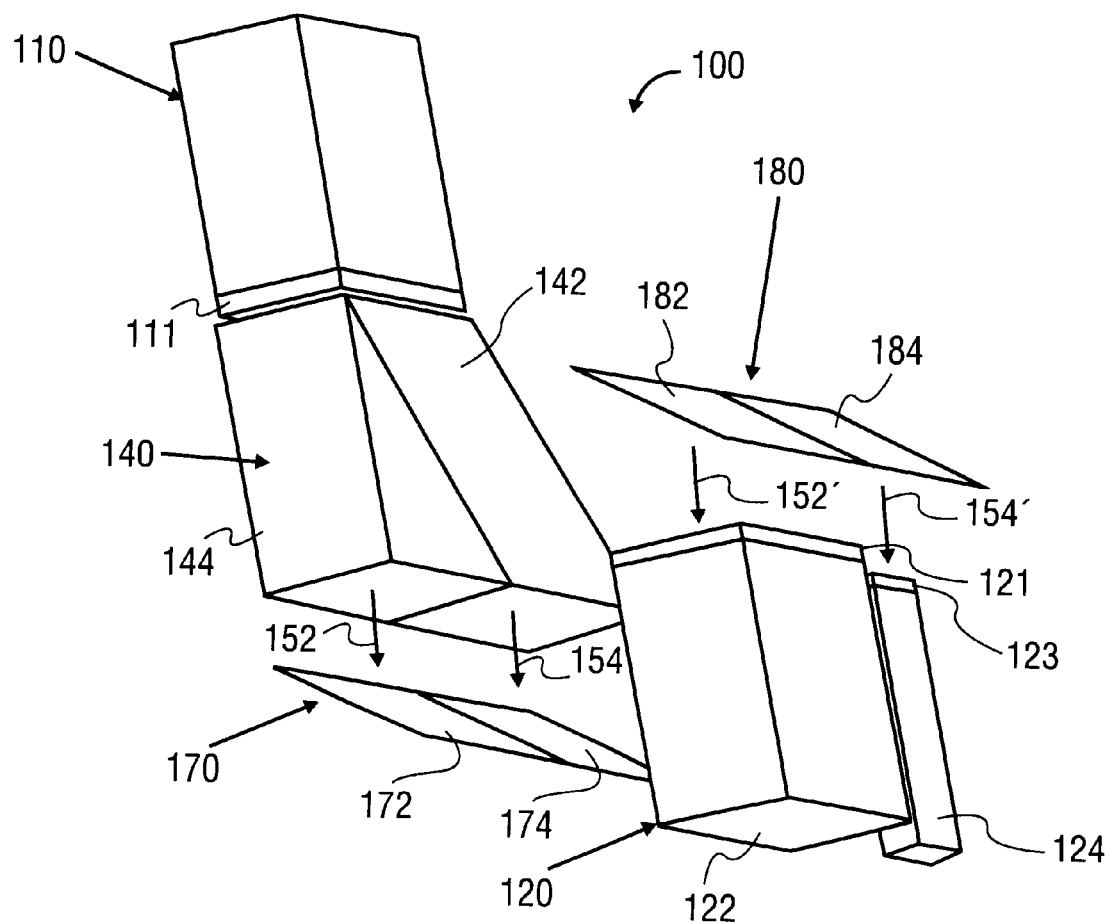
FIG. 2 shows a perspective view of an embodiment of an optical switch having a rhomboidal prism-based optical tap.

FIG. 2 shows an embodiment of a large-scale MEMS-based optical switch 100 with a rhomboidal prism-based optical tap structure. An embodiment of switch 100 can include 1024 ports (which is commonly referred to as a 1000-port or 1 K-port switch).

FIG. 2 is a simplified representation of an optical switch 100 that includes an array of input optical fibers 110 and an array of output optical fibers 120. The input optical fibers 110 and output optical fibers 120 can be arranged in a fiber block, in which the individual fibers of each array are arranged in a matrix of, for example, 32 rows of 32 fibers each. A 32 by 32 block of fibers has a total of 1024 fibers. For other embodiments, the fiber block (such as fiber block 110 or fiber block 120) may be bigger (or smaller) than a 32 by 32 block. For one embodiment, a fiber block (such as fiber block 110 or fiber block 120) may have 10% to 30% more fibers than 32 K×32 K fibers. Having 10% to 30% extra fibers in a fiber block may be prudent in view of yield issues, given that several fibers and MEMs mirrors may fail.

The array or block of input optical fibers 110 preferably includes an input lens array 111 which has a lens associated with each fiber of the array 110. The input lens array produces approximately collimated array of optical beams that are propagated from the array or block of input optical fibers 110 and further through the switch to the array of output optical fibers 120. Likewise, the array of output optical fibers 120 includes an output lens array 121. Each lens of the output lens array is associated with one of the fibers in the array of output optical fibers 120 to focus the incoming light beam into the output optical fibers via mirrors.

Switch 100 includes a beam splitter 140 that provides the optical tap function. Beam splitter 140 includes a tap portion 142 which is a rhomboidal prism. Beam splitter 140 further includes a signal path portion 144 adjacent the tap portion 142. The rhomboidal prism that is the tap portion 142 of the beam splitter 140 is further described below.

Switch 100 is a MEMS-based switch that includes an array of input mirrors 170. The array of input mirrors 170 is an array of MEMS-type microscopic gimbaled mirrors. The mirrors are selectively movable to direct light beams from the array of input optical fibers 110 to a selected fiber of the output optical fibers 120. The array of input mirrors 170 includes an array of input signal mirrors 172 and an array of input sample (or tap) mirrors 174. Each array of input signal mirrors 172 and input sample mirrors 174 can include the same number of mirrors as fibers in the array of input optical fibers 110. For the example shown in FIG. 2, for a switch having 1024 input optical fibers, each array 172 and 174 of mirrors includes 1024 mirrors.

In operation, light beams are propagated through the beam splitter 140 from the input optical fibers 110 and are split into a signal path, represented in FIG. 2 by arrow 152, and a tap path, represented-by arrow 154. The signal path 152 includes signal beams and the tap path 154 includes tap beams. The array of input signal mirrors 172 is positioned in the signal path 152 of the light beams, while the array of sample mirrors 174 is positioned in the tap path 154.

As the light beams of both the signal path 152 and the tap path 154 are reflected off the array of input mirrors 170, the light beams continue toward the array of output mirrors 180. The array of output mirrors 180 is an array of MEMs-type gimbaled mirrors. The array of output mirrors 180 includes an array of output signal mirrors 182 and an array of tap mirrors 184. For another embodiment, the array of output mirrors 180 can include an array of photodetectors (not shown) instead of or in addition to an array of tap mirrors.

After being reflected off the array of input signal mirrors 172, the light beams of the signal path 152 are reflected off the array of output signal mirrors 182 and toward the array of output optical fibers 120. The beams of the signal path 152, after being reflected from the output signal mirrors 182, continue on signal path 152' toward the array of output signal fibers 122. Each beam of paths 152 and 152' may not propagate through corresponding fibers of the input and output fiber arrays. For example, the input beam of the fiber in the first row of the first column of the array of input fibers 110 may be switched to the fiber in the second column of the third row, or any other fiber in the array of output fibers 120. This is the function of the switch.

Switch 100 incorporates port selective tap optics. A subset of the input light beams (e.g., 25 inputs) from the 1,024 input ports can be selected for the monitoring or tap function. In such a configuration, the array of output optical fibers 120 can include an array of output signal fibers 122 and an array of tap fibers 124. The array output signal fibers 122 includes an output lens array 121 with a lens for each output signal fiber of fibers 122 to focus the incoming light beams into fibers 122. The array of tap fibers 124 includes a tap lens array 123. Each lens of the tap lens array 123 is associated with one of the fibers in the array of tap optical fibers 124 to focus the incoming light beam into the tap optical fibers. The number of fibers in the array of tap fibers 124 may be less than the number of fibers in the input and output fiber arrays because only a selected few of the channels or ports may need to be monitored at any given time. The array of tap fibers 124 may be separate from the array of output signal fibers 122 or the two arrays may be integral. For another embodiment, the tap fibers 124 may be a subset of the output signal fibers in the array 122. Likewise, the tap lens array 123 may be separate from the array of output lens array 121 or the two arrays 121 and 123 may be integral. For another embodiment, the tap lens array 123 may be a subset of the output lens array 121.

The light beams of the tap path 154 are reflected off the array of sample mirrors 174 toward the array of tap mirrors 184. For one embodiment, the array of sample mirrors 174 includes the same number of mirrors as input fibers in the array of input fibers 110. For one embodiment, mirror array 174 includes 1,024 mirrors and mirror array 172 includes 1,024 mirrors. For one embodiment, the array of tap mirrors 184 may include fewer mirrors than input fibers (or ports in the switch). For one embodiment, mirror array 184 is comprised of 25 tap mirrors, Thus, the light beams of tap path 154' may be fewer than the total number of channels or ports. These light beams are directed toward selected fibers in the array of tap fibers 124. The array of tap fibers 124 is preferably coupled to monitoring equipment (not shown) or to a monitoring portion (not shown) of the hardware of the switch or network.

Figure 3:
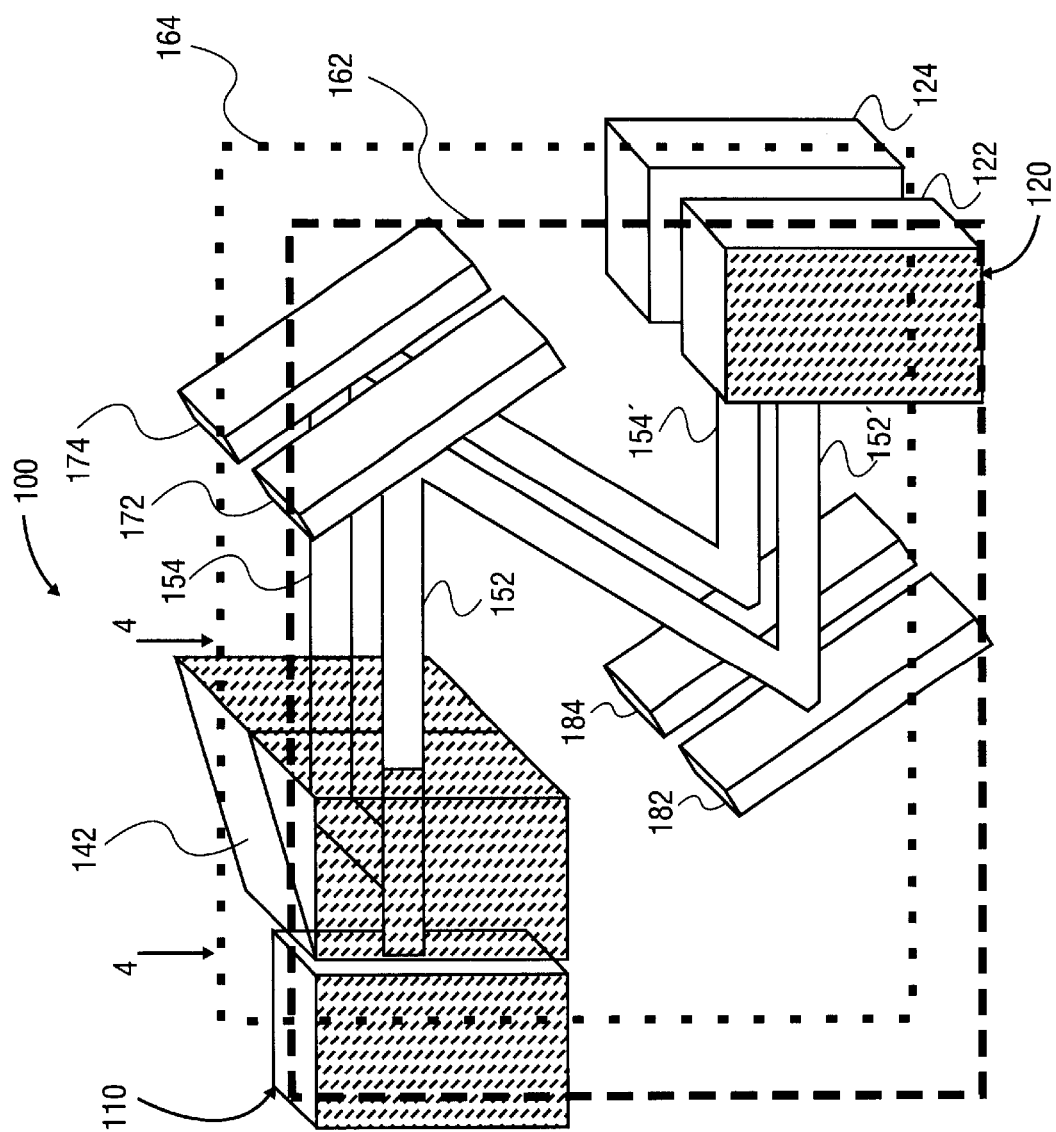
FIG. 3 shows a perspective view of an optical switch having a rhomboidal prism-based optical tap and illustrates the signal path and the tap path of the light beams.

FIG. 3 shows an orthogonal view of switch 100 and illustrates the parallel nature of the signal path 152, 152' and the tap path 154, 154'. Because of the separate signal and tap paths in switch 100, the switch 100 can be said to include two switch layers. Box 162 represents the signal layer, and box 164 represents the tap layer. Signal layer 162 has its components in the first plane, represented by box 162. The signal layer 162 components include the array of input optical fibers 110, the array of input signal mirrors 172, the array of output signal mirrors 182, and the array of output optical fibers 120 (or in the case of the array of output optical fibers 120 having separate arrays of signal and tap fibers, the signal layer 162 includes an array of output signal fibers 122).

The tap layer 164 includes the rhomboidal prism tap portion 142, the array of sample mirrors 174, the array of tap mirrors 184 (or photodetectors), and the array of output optical fibers 120 (or the case of the array of output optical fibers 120 having separate arrays of signal and tap fibers, the signal layer may include an array of tap fibers 124).

The tap path 154, 154' includes light beams that have a small portion of the input power (e.g., about 4%, or in the range of about 0.5% to about 10%). Any particular light beam of the input can be switched to any of the selected fibers of the array of tap fibers 124. The tap path can be used to monitor the high data rate signal by monitoring such parameters of the light beams as signal to noise ratio, optical power, and bit error rate, for example. The rhomboidal prism serves as a beam splitter that taps a portion of the optical signal from the main signal path while keeping the signal beams substantially parallel to the tap beams. The substantial parallelism of the beams allows the switch 100 to be assembled with relatively fewer alignment variables than other types of switches having optical tap structures that do not provide parallel signal and tap paths.

Figure 4:
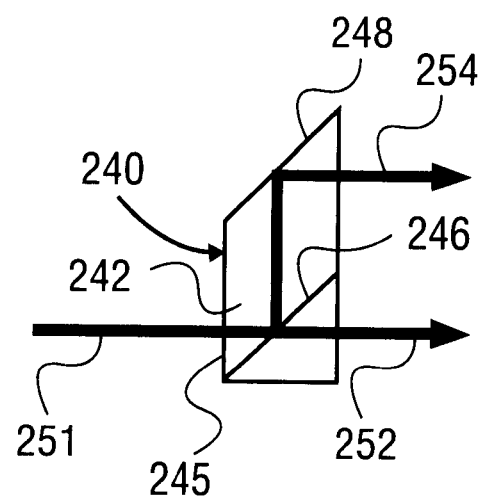
FIG. 4 shows an embodiment of a rhomboidal prism-based optical tap and illustrates the signal path and the tap path of the light beams.

FIG. 4 shows a beam splitter 240 having a rhomboidal prism 242 which is the tap portion 242 of the beam splitter 240. As shown in FIG. 4, the input path 251 of the array of light beams enters the beam splitter 240 through a first surface 245 and is incident on a partial internal reflective surface 246 that is at a non-perpendicular angle to the input path 251. The partial internal reflective surface 246 allows most of the power of the input signal (i.e., the array of input light beams from the array of input optical fibers 110) to pass directly through and propagate along the signal path 252 and toward an input array of MEMS mirrors 172. A portion of the signal is reflected toward a total internal reflective surface 248 of the rhomboidal prism tap portion 242. The signal is reflected off the total internal reflective surface 248 such that it propagates along the tap path 254 toward the tap components of the switch. Because of the geometry of the rhomboidal prism, the signal path 252 and the tap 254 are substantially parallel to each other.

Figure 5:
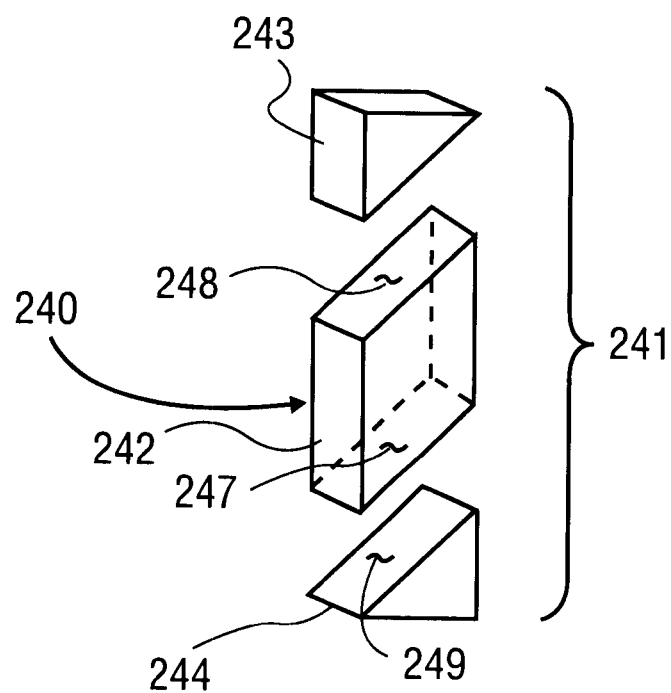
FIG. 5 shows the construction of a rhomboidal prism-based optical tap.

FIG. 5 shows one embodiment of the beam splitter 240 illustrating how the tap portion 242(i.e., rhomboidal prism) of the beam splitter 240 is constructed. A block 241 of glass, silicon, or quartz material is first provided. Block 241 can be square or rectangular in shape. The rhomboidal prism or tap portion 242 is formed by cutting wedge-shaped end portions 243 and 244 off opposing ends of the block 241. Wedge-shaped portion 243 is discarded, and wedge-shaped portion 244 is retained. The total internal reflective surface 248 is polished and no coating is necessary for the surface 248. Partial reflective surface 247 is coated with a material that can provide the partially reflective surface. Examples of materials that may be used to coat surface 247 include $Si/SiO/SiO_2$ and $TiO_2/SiO_2$. For alternative embodiments, other materials may be used to coat surface 247 to make it partially reflective. For one embodiment, wedge-shaped portion 244 may also provide a partial internal reflective surface 249. In any case, portion 244 is reassembled to tap portion 242 and provides a signal path portion 244 of the beam splitter 240. Portion 244 is reassembled to tap portion 242 by using optical epoxy to attach portion 244 to tap portion 242. The clear optical epoxy is chosen to have an index of reflection to match that of surface 247 of tap portion 242. The optical epoxy is cured either by using ultraviolet light or heat.

If portion 244 were not reassembled onto portion 242, the signal path 252 (shown in FIG. 4) would propagate in a direction that is refracted by the glass air surface rather than straight through along signal path 252.

For one embodiment, the beam splitting coating splits approximately 4% of the signal off the main signal path. For other embodiments, the beam splitting coating splits approximately 0.5% to approximately 10% of the signal off the main signal path. The split portion of the optical signal is reflected by the total internal reflection surface and becomes a tap beam in substantially the same direction and substantially parallel to the signal path.

This tap optics configuration helps to significantly reduce the alignment dimensions when a tap monitor function is added to an all-optical switch. It allows the port selective tap monitoring optical switch to have almost the same alignment scheme as an optical switch without the tap monitoring function. The reason is that the relative position accuracy of the tap mirror array and the signal mirror array can be achieved by the lithographic processing. Once the signal path is aligned, the tap path will be aligned automatically due to the parallelism of the signal and tap beams.

Figure 6:
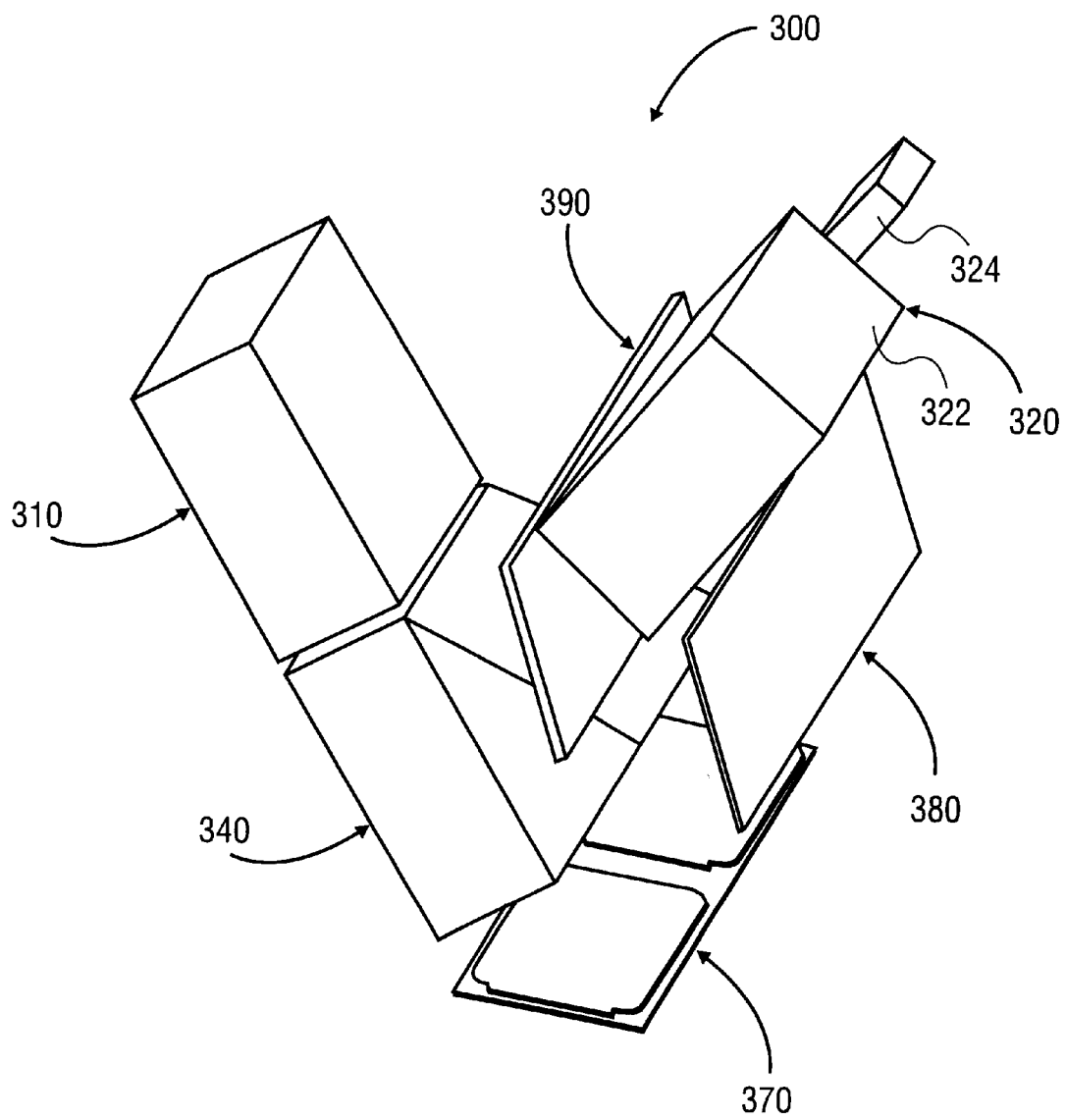
FIG. 6 shows a perspective view of another embodiment of an optical switch having a rhomboidal prism-based optical tap.

FIG. 6 is a three-dimensional simplified representation of an embodiment of a switch 300 that is a folded optics design to make switch components more compact and so the light beams have balanced path length.

Switch 300 includes an array of input optical fibers 310, a beam splitter 340, an array of output optical fibers 320, an array of input mirrors 370, and an array of output mirrors 380. The array of input fibers 310 and the array of output fibers 320 have longitudinal axes that are at an angle of approximately 60 to 90 degrees with respect to each other. This folded optics design requires a folding mirror 390 to reflect the light beams from the output mirrors 380 to the array of output optical fibers 320.

Figure 7:
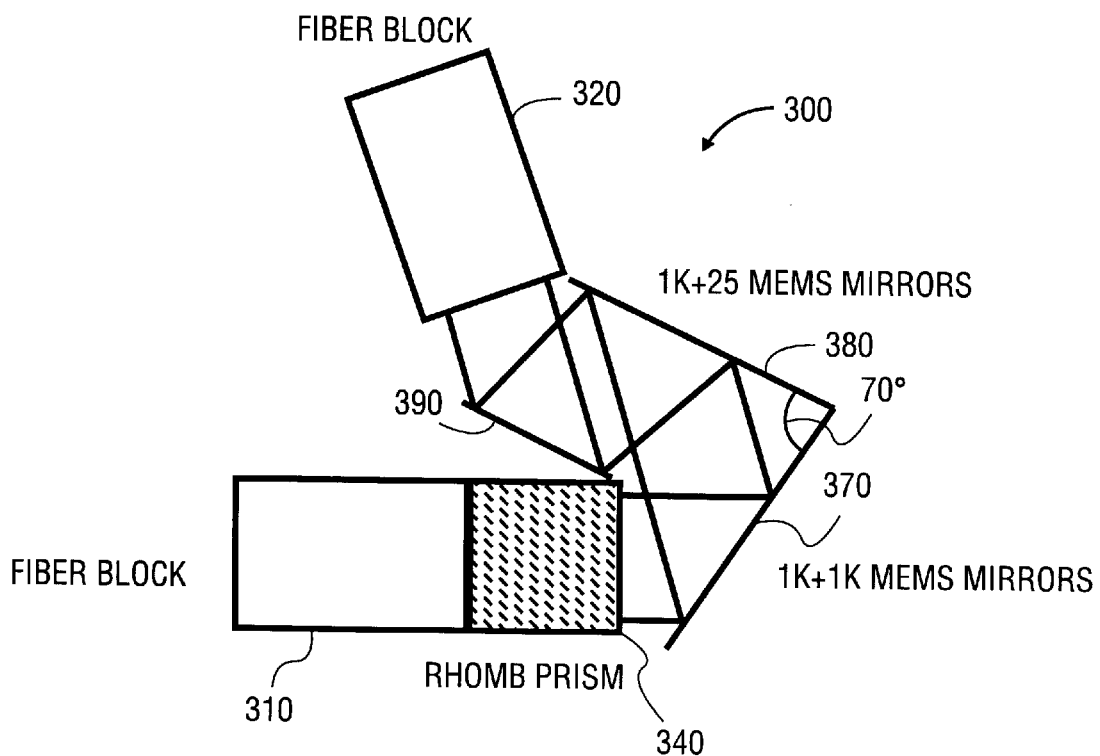
FIG. 7 shows a schematic view of the embodiment of the optical switch of FIGS. 6.

FIG. 7 shows a schematic view of the switch 300 illustrating an embodiment of the relative positions of the array of input mirrors 370, the array of output mirrors 380, and of folding mirror 390. For one embodiment, folding mirror 390 comprises one large mirror. For alternative embodiments, folding mirror 390 comprises an array of folding mirrors. For one embodiment, input mirror array 370 includes 1,024 input signal mirrors and 1,024 input tap mirrors. For one embodiment, output mirror array 380 includes 1,024 output signal mirrors and 25 tap mirrors.

The angle between the longitudinal axes of the input fiber array 310 and output fiber array 320 is approximately 70 degrees for one embodiment. For other embodiments, this angle can be from approximately 60 degrees to approximately 90 degrees.

The angle between the planes of the input mirrors 370 and output mirrors 380 is approximately 70 degrees for the embodiment shown in FIG. 7. For other embodiments, the angle between the planes of the input mirrors 370 and output mirrors 380 can be approximately 60 degrees to approximately 90 degrees. This angle is selected because the path length needs to be as short as possible.

The plane of the folding mirror 390 is substantially parallel to the plane of the array of output mirrors 380.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An optical switch comprising:
    an array of input optical fibers;
    an array of output optical fibers;
    an input lens array operatively associated with the array of input optical fibers to produce an array of approximately collimated optical beams from the array of input optical fibers;
    a rhomboidal prism beam splitter mounted with respect to the input lens array to split the approximately collimated array of optical beams into a signal path and a tap path;
    an array of input mirrors, each mirror being rotatable in two axes, the array of mirrors positioned such that the optical beams from the input lens array are incident on the array of mirrors and each optical beam is reflected in a selected direction associated with a controlled position of a corresponding mirror; and
    an output lens array operatively associated with the array of output optical fibers to focus the optical beams reflected from the mirrors into the array of output optical fibers.

2. The optical switch of claim 1 wherein the tap path is directed to an array of sample mirrors.

3. The optical switch of claim 2 wherein the tap path includes one or more tap optical beams, each tap optical beam being reflected from a corresponding sample mirror and directed to an array of tap mirrors.

4. The optical switch of claim 3 wherein the number of tap mirrors is less than the number of sample mirrors.

5. The optical switch of claim 3 wherein the array of sample mirrors is monolithically integrated with the array of input signal mirrors.

6. The optical switch of claim 3 wherein the array of tap mirrors is monolithically integrated with the array of output signal mirrors.

7. The optical switch of claim 2 wherein the array of sample mirrors is monolithically integrated with at least one array of input signal mirrors.

8. The optical switch of claim 2 wherein the tap path includes one or more tap optical beams, each tap optical beam being reflected from a corresponding sample mirror and directed to at least one photodetector.

9. The optical switch of claim 1 further comprising an array of output mirrors and an array of folding mirrors positioned in the optical switch to reflect the array of optical beams from the array of output mirrors to the output lens array, wherein the array of input optical fibers has a longitudinal axis that is at an angle of approximately 60 to 90 degrees with respect to a longitudinal axis of the array of output optical fibers.

10. The optical switch of claim 9 wherein the angle between the longitudinal axes of the array of input optical fibers and the array of output optical fibers is approximately 70 degrees.

11. The optical switch of claim 1 wherein the array of input optical fibers are positioned within a first mechanical block and the array of output optical fibers are positioned within a second mechanical block.

12. The optical switch of claim 1 wherein the rhomboidal prism beam splitter includes a partial internal reflection (PIR) surface and a total internal reflection (TIR) surface, the PIR surface and the TIR surface cooperating to split the array of optical beams into the signal path and the tap path such that the signal path is parallel to the tap path upon exiting the beam splitter.

13. An optical switch comprising:
    an array of input optical fibers;
    an array of output optical fibers;
    at least one array of mirrors positioned such that when an array of optical beams is propagated from the input optical fibers, the optical beams are incident on the array of mirrors and each optical beam is reflected in a selected direction associated with a controlled position of a corresponding mirror; and
    a rhomboidal prism beam splitter mounted with respect to the array of input fibers to split the array of optical beams into a signal path and a tap path.

14. The optical switch of claim 13 wherein the tap path is directed to an array of sample mirrors.

15. The optical switch of claim 14 wherein the tap path includes one or more tap optical beams, each tap optical beam being reflected from a corresponding sample mirror and directed to an array of tap mirrors.

16. The optical switch of claim 15 wherein the number of tap mirrors is less than the number of sample mirrors.

17. The optical switch of claim 15 wherein the array of tap mirrors is monolithically integrated with at least one array of output signal mirrors.

18. The optical switch of claim 14 wherein the array of sample mirrors is monolithically integrated with at least one array of input signal mirrors.

19. The optical switch of claim 14 wherein the tap path includes one or more tap optical beams, each tap optical beam being reflected from a corresponding sample mirror and directed to at least one photodetector.

20. The optical switch of claim 13 further comprising an array of output mirrors and at least one folding mirror positioned in the optical switch to reflect the array of optical beams from the array of output mirrors to the array of output optical fibers, wherein the array of input optical fibers has a longitudinal axis that is at an of approximately 60 to 90 degrees with respect to a longitudinal axis of the array of output optical fibers.

21. The optical switch of claim 20 wherein the angle between the longitudinal axes of the array of input optical fibers and the array of output optical fibers is approximately 70 degrees.

22. The optical switch of claim 13 wherein the rhomboidal prism beam splitter includes a partial internal reflection (PIR) surface and a total internal reflection (TIR) surface, the PIR surface and the TIR surface cooperating to split the array of optical beams into the signal path and the tap path such that the signal path is substantially parallel to the tap path upon exiting the beam splitter.

23. The optical switch of claim 13 wherein the array of input optical fibers are positioned within a first mechanical block and the array of output optical fibers are positioned within a second mechanical block.

24. An all-optical switch comprising:
   an array of input optical fibers;
   an array of output optical fibers; and
   a rhomboidal prism beam splitter positioned in operative relationship with the array of input fibers such that when an array of optical beams is propagated from the array of input optical fibers, the beam splitter splits the array of optical beams into a signal path and a tap path, the rhomboidal prism beam splitter including a partial internal reflection (PIR) surface and a total internal reflection (TIR) surface, the PIR surface and the TIR surface cooperating to split the array of optical beams into the signal path and the tap path such that the signal path is substantially parallel to the tap path upon exiting the beam splitter.

25. The all-optical switch of claim 24 wherein the tap path is directed to an array of sample mirrors.

26. The optical switch of claim 25 wherein the tap path includes one or more tap optical beams, each tap optical beam being reflected from a corresponding sample mirror and directed to an array of tap mirrors.

27. The optical switch of claim 26 wherein the number of tap mirrors is less than the number of sample mirrors.

28. The optical switch of claim 26 wherein the array of sample mirrors is monolithically integrated with the array of input signal mirrors.

29. The optical switch of claim 26 wherein the array of tap mirrors is monolithically integrated with the array of output signal mirrors.

30. The optical switch of claim 25 wherein the tap path includes one or more tap optical beams, each tap optical beam being reflected from a corresponding sample mirror and directed to at least one photodetector.

31. The all-optical switch of claim 25 wherein the array of sample mirrors is monolithically integrated with at least one array of input signal mirrors.

32. The optical switch of claim 24 further comprising an array of output mirrors and at least one folding mirror positioned in the optical switch to reflect the array of optical beams from the array of output mirrors to the array of output optical fibers, wherein the array of input optical fibers has a longitudinal axis that is at an angle of approximately 60 to 90 degrees with respect to a longitudinal axis of the array of output optical fibers.

33. The optical switch of claim 32 wherein the angle between the longitudinal axes of the array of input optical fibers and the array of output optical fibers is approximately 70 degrees.

34. The all-optical switch of claim 24 wherein the signal path propagates through the PIR surface and the tap path is reflected from the TIR surface.

35. The optical switch of claim 24 wherein the array of input optical fibers are positioned within a first mechanical block and the array of output optical fibers are positioned within a second mechanical block.

* * * * *